United States Patent [19]

James

[11] 4,231,407
[45] Nov. 4, 1980

[54] PROTECTIVE LINER FOR TIRES RESISTANT TO DISPLACEMENT DURING USE

[75] Inventor: David L. James, Fresno, Calif.

[73] Assignee: Mitchell D. James, Calif.

[21] Appl. No.: 918,475

[22] Filed: Jun. 23, 1978

[51] Int. Cl.³ .................................................. B60C 5/08
[52] U.S. Cl. ................................................... 152/351
[58] Field of Search ............... 152/351, 203, 349, 205, 152/207

[56] References Cited

U.S. PATENT DOCUMENTS 1,392,951  10/1921  Lee .................................. 152/351 X
1,774,892  9/1930   Kline ............................... 152/351 X Primary Examiner—Robert B. Reeves
Assistant Examiner—Gene A. Church
Attorney, Agent, or Firm—Huebner & Worrel

[57] ABSTRACT

A protective liner for a tire having a tread portion and housing an inflatable tube, the liner having an elongated panel of puncture resistant material adapted to be extended circumferentially about the tube within the tire; and a pair of ridges borne by the panel extending in spaced, substantially parallel relation along the panel for embedded engagement with the interior of the tire to maintain selected alignment between the tread portion thereof and the panel.

3 Claims, 5 Drawing Figures

U.S. Patent
Nov. 4, 1980
4,231,407
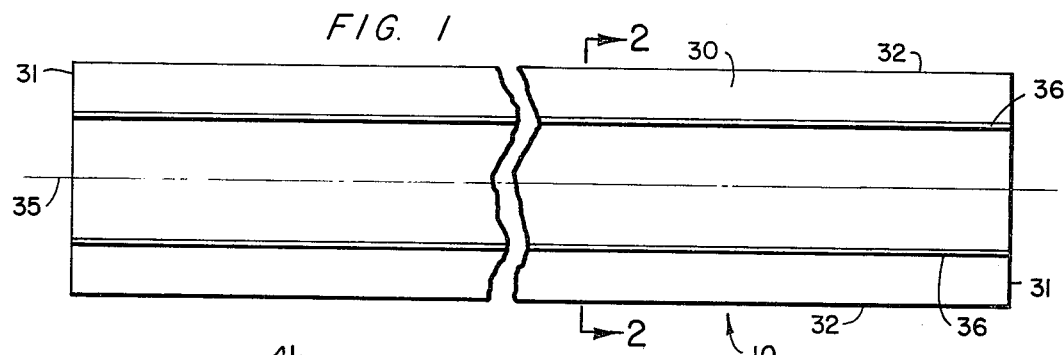
FIG. 1
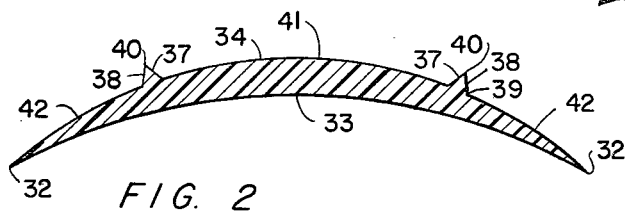
FIG. 2
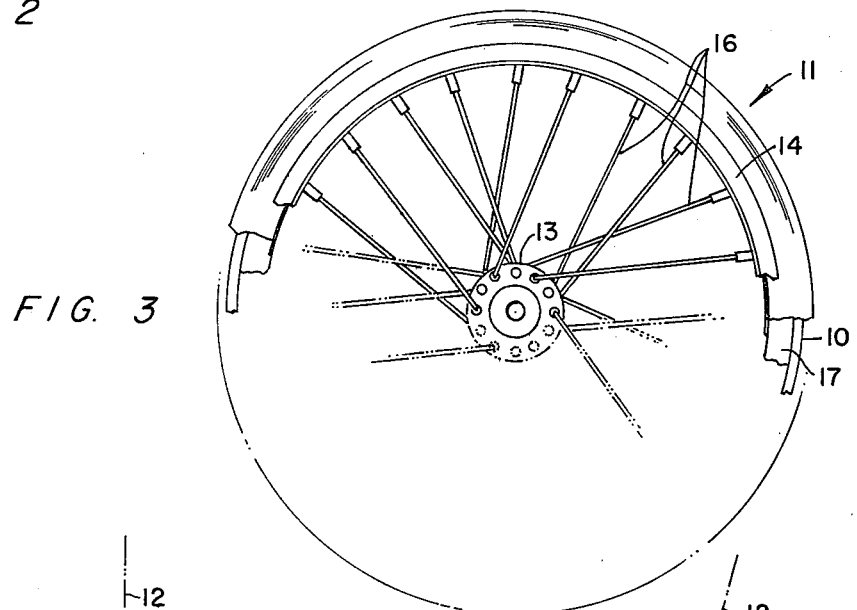
FIG. 3
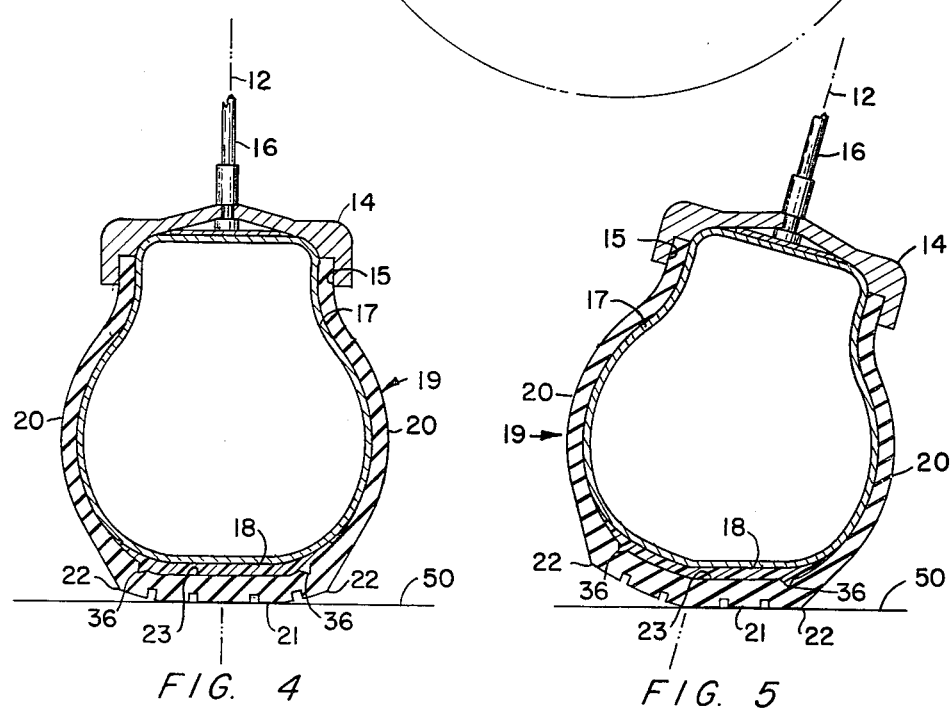
FIG. 4
FIG. 5

PROTECTIVE LINER FOR TIRES RESISTANT TO DISPLACEMENT DURING USE

BACKGROUND OF THE INVENTION

1. Field of the Invention

The present invention relates to a protective liner for tires resistant to displacement during use and more particularly to such a liner which possesses the self-operating capability, when captured between the inner surface of the tire and the pressurized tube, of resisting lateral displacement from the selected position due to flexing and shifting movements between the tube and the tire carcass during use. 2. Description of the Prior Art Characterizing the closest prior art of which the applicant is aware and in compliance with 37 C.F.R. 1.97 and 1.98, attention is invited to the following U.S. Pat. Nos. copies of which are attached: 514,796 Wegner Feb. 13, 1894, 744,435 Tennant Nov. 17, 1903, 1,100,950 Broderick June 23, 1914, 1,181,065 Coffield Apr. 25, 1916, 1,273,446 Belton July 23, 1918, 1,371,097 Jones Mar. 8, 1921, 1,409,762 Patchin Mar. 14, 1922, 2,740,448 Richardson Apr. 3, 1956, 3,111,973 Lambach Nov. 26, 1963.

The Wegner U.S. Pat. No. 514,796 is directed to a pneumatic tire incorporating a protective barrier.

The Tennant U.S. Pat. No. 744,435 reveals a pneumatic tire having a metallic protecting strip.

The Broderick U.S. Pat. No. 1,100,950 shows tire armor.

The Coffield U.S. Pat. No. 1,181,065 discloses a pneumatic tire protector.

The Belton U.S. Pat. No. 1,273,446 reveals a protective liner for pneumatic tires.

The Jones U.S. Pat. No. 1,371,097 is directed to a pneumatic tire protector.

The Patchin U.S. Pat. No. 1,409,762 shows a pneumatic puncture-proof single tube tire.

The Richardson U.S. Pat. No. 2,740,448 discloses a tire liner.

The Lambach U.S. Pat. No. 3,111,973 shows an armored vehicle tire.

The problem of tire puncture is a constant hazard in vehicles using pneumatic tires particularly where thin walled tires are employed such as on certain off-road vehicles and in bicycle tires, particularly of the racing type. It is known in tires of a variety of types to employ a protective barrier of puncture resistant material which is extended circumferentially about the pressurized tube of a tire. Such barriers are arcuate in cross section and are captured between the interior surface of the tire and the tube to resist puncture of the tube by objects penetrating the tire. Since such puncturing of the tire itself is not necessarily harmful if the pressurized tube is not also punctured, the implanting of a protective barrier in many instances permits continued use of the tire even where such punctures occur.

While prior art tire barriers have performed their intended function when properly positioned in the tire, a chronic difficulty with such barriers is that they rapidly become displaced due to flexing and shifting of the tire carcass and pressurized tube relative to each other during use. Such shifting causes the liner to be moved sidewardly so as to leave substantial portions of the tube unprotected by any portion of the barrier. Additionally, such displacement causes the tire to become unbalanced which contributes to such difficulties as uneven wear, vibration and in some instances even damage to the tube or tire. While it has been known to attempt adhesively to retain a barrier in position within a tire, this has not proved a satisfactory solution to the problem for several reasons. In some instances the adhesive collects within the tire and hardens to contribute to tire imbalance. In other instances, the flexing and heat developed during use of the tire causes the adhesive to breakdown and lose its adhesive capability so that over a relatively short period of time the barrier is no longer held firmly in position. Some types of adhesive may, over a period of time, attack either or both the tube and the tire resulting in damage to them. Still other difficulties inherent in this process reside in the difficulties of applying the adhesive and attaching the barrier.

Therefore, it has long been known that it would be desirable to have a protective liner for tires which resists displacement from a selected installed position by the flexing and shifting between the pressurized tube and tire during normal use without requiring the use of adhesives and possessing a structure which does not interfere with normal use of the tire or otherwise interfere with its desired operative characteristics.

SUMMARY OF THE INVENTION

Therefore, it is an object of the present invention to provide an improved protective liner for tires resistant to displacement during use.

Another object is to provide such a protective liner which employs forces, which normally contribute to displacement of prior art liners, to retain the protective liner of the present invention in the desired installed position.

Another object is to provide such a protective liner which does not require the use of adhesive to retain its optimum installed position.

Another object is to provide such a protective liner which can be installed simply and quickly without close attention to those portions of the liner which achieve the desired operative effect.

Another object is to provide such a protective liner in which those portions of the liner operating to retain it in position do not interfere with the desired operative characteristics of the tire.

Another object is to provide such a protective liner in which those portions of the liner resisting displacement do not breakdown over a long period of use due to the normal destructive heating and flexing encountered in normal use.

Further objects and advantages are to provide improved elements and arrangements thereof in an apparatus for the purposes described which is dependable, economical, durable and fully effective in accomplishing its intended purposes.

BRIEF DESCRIPTION OF THE DRAWING

FIG. 1 is a fragmentary top plan view of the protective liner of the present invention.

FIG. 2 is a somewhat enlarged transverse section taken on line 2—2 in FIG. 1.

FIG. 3 is a fragmentary side elevation of a motorcycle wheel showing the protective liner in an installed operative position.

FIG. 4 is a somewhat enlarged fragmentary vertical section of the wheel of FIG. 3 mounting the protective liner and disposed in a normal attitude for movement along a straight path of travel.

FIG. 5 is a fragmentary vertical section of the wheel of FIG. 4 disposed in an attitude such as that adopted in going around a corner.

DESCRIPTION OF THE PREFERRED EMBODIMENT

Referring more particularly to the drawing, the protective liner of the present invention is generally indicated by numeral 10 in FIG. 1. It will become apparent that the protective liner of the present invention can be adapted to use in virtually any type of tire having a pressurized inner tube. The dimensions can be varied so that the liner is of sufficient length to extend about the circumference of the inner tube and of sufficient width to wrap laterally about the tube substantially as shown in FIGS. 4 and 5. For illustrative convenience, however, the protective liner is described herein and shown in the drawing for use in a motorcycle tire.

A wheel 11 for a motorcycle is shown fragmentarily in FIG. 3. The wheel may be viewed as being formed along a flat plane of reference 12 identified in FIGS. 4 and 5. The wheel has a central hub 13 and an annular ring 14 concentric to the hub. The ring is U-shaped in cross section forming a channel 15 extending peripherally about the ring in outwardly facing relation. A plurality of spokes 16 interconnect the hub and ring in the conventional fashion to form the wheel. Thus, the hub, annular ring and spokes are aligned in the plane of reference 12.

A pressurized inner tube 17 is extended about the annular ring 14. The tube has an outer or peripheral portion 18 at the periphery of the tube. A tire 19 is mounted on the annular ring in the conventional manner extending about the pressurized inner tube 17 and received in the channel 15 of the annular ring. The tire has opposite side walls 20 and a tread portion 21 extending about the periphery of the tire. The tread portion has lateral edges or boundaries 22 between which the tread portion extends, as shown in FIGS. 4 and 5. The tire has a soft resilient inner surface or wall 23. Such inner walls are normally used in tires for purposes of protecting the pressurized inner tube during use.

The protective liner 10 of the present invention is shown best in FIGS. 1 and 2. The liner consists of an elongated strip or panel 30. The panel has opposite ends 31 and substantially parallel lateral edges 32. Although a variety of materials can be employed for construction of the panel, it is preferred that the panel be constructed of a resilient plastic material, such as polyvinyl chloride, and be formed by a suitable extrusion process. As will hereinafter be described, the panel is adapted to extend circumferentially about the inner tube and to wrap a suitable distance laterally about the tube. The desired degree of lateral extension of the panel about the inner tube for any given size tire can best be seen in FIGS. 4 and 5. This proportional relationship can, of course, be varied to suit the needs of the specific tire involved. The length of the panel can be such that the opposite ends 31 overlap when installed in the tire or such that the opposite ends are disposed in abutted relation when so installed.

The panel 30 has a concave inner surface 33 and a convex outer surface 34. For purposes of descriptive convenience, the panel is viewed as having a center line 35 along which the panel is longitudinally oriented, as best shown in FIG. 1. Thus, the lateral edges 32 of the panel are parallel to and on opposite sides of the center line. As can best be seen in FIG. 2, the panel preferably is of an arched or arcuate construction in cross section and is of tapered thickness extending from a maximum thickness at the center line to a minimum thickness at the lateral edges.

A pair of ribs or ridges 36 are mounted on the convex outer surface 34 of the panel 30. The ridges are preferably formed by the extrusion process which forms the ridges as an integral part of the panel. The ridges extend in spaced, substantially parallel relation longitudinally of the panel. The ridges are preferably spaced equal distances on opposite sides of and parallel to the center line 35. The distance of spacing of the ridges from each other is preferably equal to or slightly smaller than the distance between the lateral edges 22 of the tread portion 21 of the tire, as can best be seen in FIGS. 4 and 5. The specific configuration of the ridges as well as their respective positions on the panel can, of course, be varied. However, it has been found that the ridges serve to optimum operative advantage if configured as hereinafter described. Thus, in the preferred configuration, each ridge has outwardly convergent inner and outer side portions or surfaces 37 and 38 respectively, as can best be seen in FIG. 2. The surfaces of each ridge at their respective junctures with the convex outer surface of the panel define a base 39. The surfaces of each ridge converge to form an apex 40. The dimensions of the ridges can be varied to suit the needs of the particular tire involved. This, of course, is controlled to some degree by the size of the tire within which the liner is to be used. For example, in a liner for a racing type bicycle tire in which the width of the panel is one inch [2.54 cm], the distance between the base 39 and the apex 40 of each ridge is preferably approximately 1/32 of an inch [approximately 0.079 cm] and the width of the base is approximately the same distance. However, it will be understood that variations in these dimensions can be employed without departing from the present invention. For purposes of illustrative convenience, the portion of the panel between the ridges is viewed as a central portion 41 and the portions of the panel outwardly of the ridges are viewed as lateral or flap portions 42.

OPERATION

The operation of the described embodiment of the subject invention is believed to be clearly apparent and is briefly summarized at this point. The protective liner 10 is installed by deflating the pressurized inner tube 17 to permit removal or partial removal of the tire carcass from the annular ring 14 of the wheel 11. The liner is thereafter inserted between the resilient inner wall 23 of the tire and the outer portion 18 of the inner tube 17. The liner is disposed, as best shown in FIGS. 4 and 5, with the convex outer surface 34 and ridges 36 disposed in facing engagement with the inner wall 20 of the tire. The liner is positioned so that the ridges are positioned in as nearly precise individual alignment with the lateral boundaries 22 of the tread portion 21 as circumstances permit. The panel is simply wrapped about the inner wall 20 within the tire so that it will extend circumferentially about the outer portion 18 of the tube.

Subsequently, the tire is again positioned in the normal operative position in the channel 15 of the annular ring 14, as shown in FIGS. 4 and 5, and the inner tube is again inflated. Such inflation of the tube to normal pressure causes the panel 30 of the liner 10 to be captured between the outer portion 18 of the tube 17 and the inner wall 23 of the tire. Inflation of the tube additionally causes the ridges 36 to be embedded in the resilient inner wall 23 of the tire. Thus, the ridges are individually substantially aligned with their respective lateral boundaries 22 of the tread portion 21 of the tire. The center line 35 of the panel is, by such positioning, placed substantially in coincidence with the plane of reference 12 of the wheel 11.

During normal use of the wheel 11, the tread portion 21 of the tire 19 is, of course, received for earth traversing movement on a supporting or road surface indicated at 50. The weight of the vehicle supported on the tread portion 21 of the tire 19 exerts relative pressure vertically upwardly and inwardly against the pressurized inner tube 17. As can best be visualized in FIG. 4, when the wheel is oriented so that the plane of reference 12 of the wheel is vertical, the force exerted on the tread portion of the tire is transmitted through the tread portion and against the inner surfaces 37 of the ridges 36. The oblique disposition of the inner surfaces 37 relative to the plane of reference 12 causes these vertical forces to be diverted to some extent by the inner surfaces generally laterally of the center line 35 in opposite directions. This action tends to urge the ridges from each other effectively to tension the central portion 41 therebetween by balanced, counteracting forces. Thus, the central portion of the panel is not only placed under compression by the weight of the vehicle to retain the ridges in embedded engagement with the inner wall 23, but the forces which normally contribute to displacement of prior art barriers are harnessed in the liner of the present invention in a manner which serves to resist such displacement.

FIG. 5 shows the tire of the wheel 11 oriented in an attitude characteristic of that adopted in cornering of the vehicle on which the wheel is mounted. In this attitude the plane of reference 12 thereof is oblique to the road surface 50. Since the center line 35 of the panel and the plane of reference are in substantial coincidence when the liner is installed as described, the ridges 36 of the panel 30 are canted to one side relative to the road surface. Thus, the outer surface 38 of the ridge on the right as viewed in FIG. 5 is disposed to receive a greater portion of the pressure exerted on the ridge by the weight of the vehicle. It has been found that this action operates to resist forces created during cornering and similar maneuvers which contribute to displacement of prior art barriers over a period of use. Of course, the same effect is created on the outer surface of the other ridge when the attitude adopted places the pressure on the other half of the tread portion of the tire as in cornering in the opposite direction. In any event, the major effect of the barrier in resisting such displacement is achieved by embedding of the ridges in the inner wall 23 of the tire.

Therefore, the protective liner of the present invention operates during use to resist displacement from its selected installed position within the tire without the use of adhesives or other supplementation so as to serve, during a long operational life, as an effective barrier to puncture of the pressurized inner tube within the tire without the necessity for repositioning and avoiding the other disadvantages encountered in prior art devices.

Although the invention has been herein shown and described in what is conceived to be the most practical and preferred embodiment, it is recognized that departures may be made therefrom within the scope of the invention, which is not to be limited to the illustrative details disclosed.

Having described my invention what I claim as new and desire to secure by Letters Patent is:

1. A protective liner for a tire having a tread portion with lateral boundaries extending circumferentially about the tire equal distances on opposite sides of a plane of reference passing through the tire substantially normal to its intended axis of rotation, a soft resilient inner surface and housing a pressurized tube, the liner comprising an elongated strip of puncture resistant material captured between the pressurized tube and the inner surface of the tire extending circumferentially about the tube; and a pair of spaced ribs integral with the liner each having side surfaces disposed in planes outwardly convergent to an apex and the ribs extending substantially lengthwise of the liner for embedded engagement with the interior surface of the tire substantially aligned with the tread portion of the tire, each rib having an outer surface substantially parallel to the plane of reference and an inner surface obliquely related to the plane of reference whereby compression of the liner between the tube and the tire causes the inner surface of the ribs to urge the ribs from each other to tension the liner transversely therebetween to resist displacement in the tire.

2. A protective liner for use in a tire having a tread portion with lateral boundaries extending circumferentially about the tire and equal distances on opposite sides of a plane of reference passing through the tire substantially normal to its intended axis of rotation, said tire having an arcuate inner surface and being adapted to receive an inner tube inflatable to engage said inner surface of the tire thereby to pressurize the tire, the liner comprising a panel of puncture resistant material interposed between such tube and tire elongated along a center line sufficient to extend about the circumference of the inner tube when inflated, a width sufficient to extend laterally about the inner tube beyond the tread portion of the tire and being transversely arched to provide opposite concave and convex surfaces for individual mating engagement with the inner tube and inner surface of the tire respectively and a pair of ribs integral with the convex surface of the panel in substantially parallel relation extending substantially the entire length of the panel and being spaced from each other on opposite sides of the center line a distance such that when the center line of the panel is disposed in coincidence with said plane of reference of the tire the ribs are individually substantially aligned with the lateral boundaries of the tread portion of the tire, the ribs having planar outer surfaces substantially parallel to the plane of reference and planar inner surfaces which outwardly converge with the outer surfaces to apices, the apices being embedded in the inner surface of the tire by compression of the liner between the tube and the inner surface of the tire, the inner surfaces of the ribs being oblique to the plane of reference and compression of the liner between the tube and tire urging the ribs from each other to tension the liner therebetween to retain the center line and plane of reference in substantial coincidence during use of the tire.

3. A protective liner for a tire having a substantially smooth soft resilient inner surface, a symmetrical plane of reference passing through the tire substantially normal to its intended axis of rotation, and an inflatable pneumatic inner tube, the liner comprising an annular panel of puncture resisting material circumscribing the tube within the tire; and ribs integral with the liner disposed on opposite sides of the plane of reference each having an outer planar surface substantially parallel to the plane of reference and inner planar surfaces outwardly convergent with their respective outer surfaces obliquely to the plane of reference whereby inflation of the tube within the liner and tire compresses the ribs against the inner surface of the tire whereby the oblique inner surfaces of the ribs engage the tire and urge the ribs apart to tension the liner transversely between the ribs to resist inadvertent displacement of the liner in the tire.

* * * * *